(12) United States Patent
Kraxner et al.

(10) Patent No.: US 7,147,095 B2
(45) Date of Patent: Dec. 12, 2006

(54) GEARSHIFT TRANSMISSION FOR A MOTOR VEHICLE WITH HYDRAULICALLY ACTUATED MULTIPLE CLUTCH

(75) Inventors: Dieter Kraxner, Wurmberg (DE); Klaus Tiede, Sachsenheim (DE); Wolfgang Grosspietsch, Schweinfurt (DE); Paul Kraus, Niederwerrn (DE)

(73) Assignees: Dr. Ing. h.c.F. Porsche Aktiengesellschaft, Stuttgart (DE); ZF Sachs AG, Schweinfurt (DE)

( * ) Notice: Subject to any disclaimer, the term of this patent is extended or adjusted under 35 U.S.C. 154(b) by 127 days.

(21) Appl. No.: 10/507,632

(22) PCT Filed: Mar. 26, 2003

(86) PCT No.: PCT/EP03/03108

§ 371 (c)(1),
(2), (4) Date: Sep. 14, 2004

(87) PCT Pub. No.: WO03/102438

PCT Pub. Date: Dec. 11, 2003

(65) Prior Publication Data

US 2005/0139023 A1    Jun. 30, 2005

(30) Foreign Application Priority Data

May 29, 2002   (DE) ................................ 102 23 780

(51) Int. Cl.
*F16D 25/10*   (2006.01)
*B60K 17/02*   (2006.01)

(52) U.S. Cl. .................. 192/87.15; 74/330; 192/87.11

(58) Field of Classification Search ............. 192/87.11, 192/87.14, 87.15, 106 F
See application file for complete search history.

(56) References Cited

U.S. PATENT DOCUMENTS

| 2,375,440 | A | | 5/1945 | Rosche |
| 3,182,775 | A | | 5/1965 | Schall |
| 3,747,436 | A | * | 7/1973 | Hause .......................... 475/69 |
| 5,647,816 | A | * | 7/1997 | Michioka et al. ........... 475/285 |

FOREIGN PATENT DOCUMENTS

| DE |    37437 | 11/1965 |
| DE | 10004190 |  4/2001 |
| DE | 10044493 |  3/2002 |
| DE | 10203618 |  2/2003 |
| EP |   078116 |  5/1983 |
| FR |  2805321 |  8/2001 |

\* cited by examiner

*Primary Examiner*—Rodney H. Bonck
(74) *Attorney, Agent, or Firm*—Crowell & Moring LLP

(57) ABSTRACT

A gearshift mechanism for a motor vehicle with hydraulically actuated multiple clutch, particularly a twin clutch, has a first gear input shaft to drive a first group of gears and a second gear input shaft to drive a second group of gears. The two gear input shafts are each assigned a clutch unit being coaxial to one another. A stationary housing accommodates the two clutch units. At its end face, the housing can be closed off by a housing cover that has a central opening through which a drive hub of a clutch cage is guided. The housing cover is provided with a bearing flange around the central opening, on the outside of which the clutch cage is supported. This advantageously supports the clutch on the housing and makes it possible to achieve a support effect for a dual mass flywheel or the crankshaft end of the internal combustion engine.

13 Claims, 1 Drawing Sheet

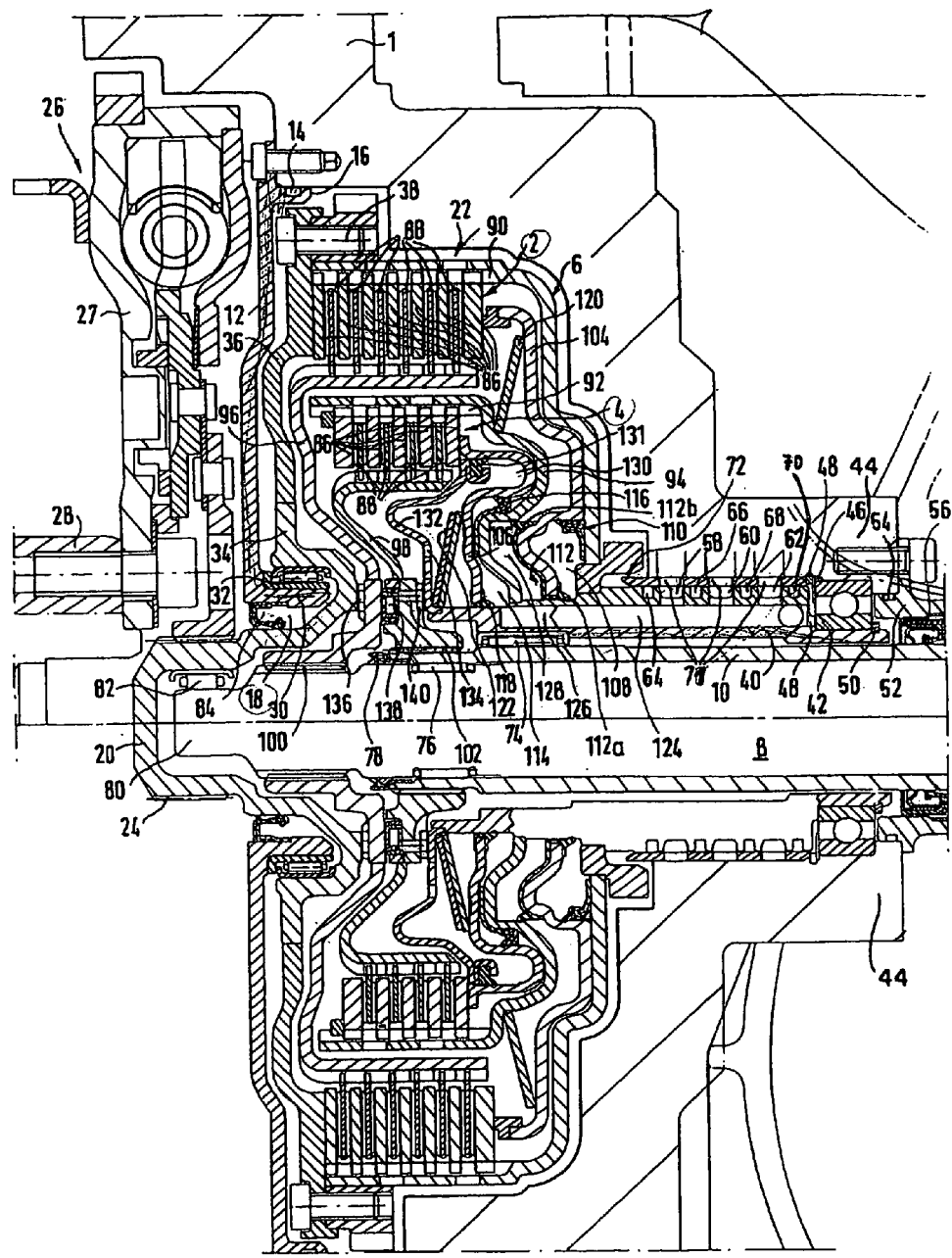

GEARSHIFT TRANSMISSION FOR A MOTOR VEHICLE WITH HYDRAULICALLY ACTUATED MULTIPLE CLUTCH

BACKGROUND OF THE INVENTION

The present invention relates to a gearshift mechanism for a motor vehicle with multiple clutch particularly a twin clutch, with a first gear input shaft for driving a first group of gears, and a second gear input shaft for driving a second group of gears, wherein the two gear input shafts are each assigned a clutch unit and the two gear input shafts and the two clutch units are arranged coaxial to one another, and with a stationary housing which accommodates the two clutch units and which can be closed off on the end face by a housing cover that has a central opening through which is guided a drive hub of a clutch cage.

DE 100 04 190 A1 discloses a multiple-clutch arrangement in which the clutch, or the clutch cage accommodating the two clutch units, is axially and radially supported in bearings on the two gear input shafts. As a result, the tolerances to be met by the gearbox in the area of the housing dome and the clutch arrangement are less stringent. When the clutch is supported in this manner, however, there is a risk that any wobble of the flywheel mounted to the crankshaft end is transmitted to the clutch.

SUMMARY OF THE INVENTION

An object of the present invention, therefore, is to improve the support or the bearing assembly of the clutch in such a way as to prevent or attenuate flywheel wobble or to achieve a support effect for the crankshaft end.

This object has been attained by providing the housing cover with a bearing flange around its central opening on the outside of which the clutch cage is mounted or fitted.

The present invention provides that the clutch cage enclosing the clutch units is supported on a housing cover of the housing accommodating the clutch. For this purpose, the housing cover has a bearing flange around a central opening through which a drive hub of the clutch cage is guided. The clutch cage is mounted or supported on the outside of this bearing flange.

The clutch cage has a clutch cover accommodating the drive hub. This clutch cover on the one hand is screwed to the clutch cage and on the other hand is provided with a bearing collar in its hub area. The bearing collar is supported on the bearing flange of the housing cover via a radial bearing.

The clutch cage in its axial extension further has a rotating component for the oil supply to the clutch units. This rotating component is coaxial to the outer gear shaft and is radially supported and axially fixed in the clutch dome or the gearbox via a fixed bearing.

Three annular grooves are advantageously provided along the outer circumference of the rotating component to supply, on one hand, oil from pressure chambers to actuate the two clutch units and, on the other hand, coolant to the clutch disks and oil from the pressure equalization chambers opposite the pressure chambers. Because the oil is supplied only radially via the rotating component, the shaft seal rings adjacent to the rotating component are not or only slightly exposed to the oil pressure.

The outer gear shaft, which is configured as a hollow shaft, is supported via radial bearing in the rotating component, while the inner gear shaft, which is a solid shaft, is supported on the outer gear shaft, also via a radial bearing, which is accommodated in an annular groove made in the solid shaft.

The housing cover screwed to the clutch dome or the gearbox forms a good bearing base for the multiple clutch by a simple centering of the bearing seats for the fixed bearing on the rotating component and the radial bearing on the bearing flange of the housing cover in relation to each other.

BRIEF DESCRIPTION OF THE DRAWINGS

The sole drawing FIGURE shows a longitudinal section through a gearshift mechanism in the area of the clutch according to the present invention.

DETAILED DESCRIPTION OF A CURRENTLY PREFERRED EMBODIMENT

A housing, hereinafter referred to as housing dome 1, accommodates a twin clutch 6 consisting of two clutch units 2, 4. The housing dome 1 can be either arranged as a separate component in a drive train of an internal combustion engine between the engine and the gearing or, as an alternative, integrally formed from the gearbox. The twin clutch 6 receives two gear input shafts 8, 10 which interact in a known manner with the regulation two clutch units 2, 4 to mutually shift a first and a second group of gears. The twin clutch 6 is closed oil-tight by a separate housing cover 12 that is screwed to the housing dome 1 and sealed. For this purpose, the housing cover 12 on its radial outer end has a collar 16 provided with a groove 14 for receiving a seal ring. The housing cover 12 has a central opening 18 through which is guided a drive hub 20 of a clutch cage 22 of the twin clutch 6. The drive hub 20 has external gearing 24 that engages with the internal gearing of a torsional vibration damper 26. The primary side 27 of the torsional vibration damper, which is integrated into a dual mass flywheel that has a known structure not further described here, is screwed to the crankshaft end 28 of the engine unit (not depicted for clarity of understanding).

The central opening 18 is bounded by an inwardly pointing bearing flange 30 formed from the housing cover 12. The clutch cage 22 is supported on the outside of the bearing flange 30 via a radial bearing 32 on the engine side. In the illustrated embodiment, this radial bearing 32 is configured as an anti-friction bearing. Alternatively, a plain bearing configuration is also contemplated. For this purpose, the clutch cage 22 has a clutch cover 36 that is provided with a bearing collar 34 and mounted to the clutch cage 22 via bolts 38.

On the gear side, the clutch cage 22 is extended by a rotating component 40 which, for this purpose, coaxially and rotatably encloses the outer gear input shaft. The rotating component 40, or the clutch cage 22, on its gear-side end is supported in the housing dome 1 via a ball bearing 42. The ball bearing 42 is accommodated in the cylindrical neck section 44 of the housing dome 1 and is clamped or fixed in both axial directions. To this end, the ball bearing 42 on the side facing the gearing is accommodated in a stepped bore of the neck section 44 and on the other side is axially secured via a thrust washer 46. The thrust washer 46 in turn is secured by a snap ring 48 arranged in an internal groove of the cylindrical neck section 44. The rotating component 40 is further secured against axial displacement in relation to the ball bearing 42. For this purpose, a left-aligned and right-aligned stop 46, 50 are provided on the rotating component 40 respectively to the left and right of the ball bearing 42. The right-aligned stop 50 in turn is formed by a snap ring that is inserted into a circumferential groove made in the outer circumference of the rotating component 40.

On the gear side, on the end face of the cylindrical neck section 44, the housing dome 1 is terminated via a second housing cover 52, which is screwed to the neck section 44 and is sealed relative to the housing dome 1 via an O-ring 54. The two gear shafts 8, 10 guided through the housing cover 52 are sealed via a shaft seal ring 56.

Along its outer circumference the rotating component 40 has three annular grooves 58, 60, 62 used for the oil supply to the clutch units 2, 4 as will be explained in greater detail below. These three annular grooves are mutually sealed by piston rings that are inserted into the corresponding annular grooves 64, 66, 68 and 70 provided for this purpose. In the area of the oil feed, a bushing 72 provided with oil feed openings 71 is inserted between the rotating component 40 and the opening of the cylindrical neck section 44.

The outer gear input shaft 10 is supported relative to the rotating component 40 of the clutch cage 22 by a radial bearing that is configured as a needle bearing 74. The inner gear input shaft 8, which is a solid shaft, is supported relative to the outer gear input shaft 10, which is a hollow shaft, via a radial bearing 76. The radial bearing 76 is inserted into an annular groove made in the solid shaft 8. As a result, the outer circumference of the shaft seal ring 78 arranged on the end face side of the hollow shaft 10 can be made smaller. The shaft seal ring 78 is used to seal off the gear oil that is conducted between the hollow shaft 10 and the solid shaft 8 and is required, among other things, to lubricate the radial bearing 76. As an alternative, or in addition to, the support of the gear input shafts 8, 10 in the clutch cage 22 by the radial bearing 74, the peg-shaped end 80 of the solid shaft 8 can be supported relative to the drive hub 20 by a radial bearing 82 configured as a needle bearing. To seal the drive hub 20 relative to the housing cover 12, a shaft seal ring 84 is provided between the inside of the bearing flange 30 and the outside of the drive hub 20.

The structure and the mode of operation of the two clutch units 2, 4 arranged in the clutch cage 22 is known, for example, from DE 100 04 190 A1 and is therefore described in greater detail below only to the extent necessary. The two clutch units 2, 4 have a plurality of clutch disks that are configured as plates and are disposed alternately one behind the other as driving, externally geared friction disks 86 and driven, internally geared disks 88. The externally geared friction disks, hereinafter referred to as external disks 86, of the clutch unit 2 engage with grooves 90 of the clutch cage 22. Analogously, the externally geared friction disks 86 of the clutch unit 4 engage with grooves 92 of an external disk carrier 94 which is integrally connected with the rotating component 40 of the clutch cage 22. The driven, internally geared disks, hereinafter referred to as internal disks 88, are each associated with an internal disk carrier 96 or 98. The internal disk carrier 96 of the clutch unit 2 is non-rotatably connected with the solid shaft 8 via gear teeth 100. The internal disk carrier 98 of the clutch unit 4 is non-rotatably connected with the hollow shaft 10 via gear teeth 102.

The actuating pistons 104, 106 are arranged on the two externally geared end disks 86 of the two clutch units 2, 4 and through hydraulic pressurization press the external disks 86 against the internal disks 88. A pressure chamber 108 is provided for the pressurization of the clutch unit 2 and is sealed via corresponding sealing elements 110, 112. Analogously, a pressure chamber 114 is provided for the actuating piston 106 and is likewise sealed via sealing elements 116, 118. In the non-engaged state of the two clutch units 2, 4 the actuating pistons 104, 106 are pressed against the clutch cage 22 or against the disk carrier 94 via corresponding diaphragm springs 120, 122.

The pressure chamber 108 is supplied with oil via the annular groove 58 and the axial bore 124 provided in the rotating component 40. The pressure chamber 114 is supplied with oil via the annular groove 62 and an axial bore 126. The two pressure chambers 108, 114 are respectively opposite a pressure equalization chamber 128, 130, which are supplied with oil via the annular groove 60 and via a third axial bore (not depicted) in the rotating component 40. At higher speeds the centrifugal force may affect the engagement motion of the two actuating pistons 104, 106. The pressure equalization chambers 128, 130 allows for compensation of the pressure forces applied to the piston as a result of the centrifugal force. The pressure equalization chambers 128, 130 in turn are sealed by sealing elements 112, 131. The sealing element 112 has two sealing lips 112a, 112b. The sealing element 112a seals the pressure chamber 108 while the sealing lip 112b seals the pressure equalization chamber 128. The pressure equalization chamber 130 is bounded by a wall portion 132 in which an opening 134 is formed. The oil in the pressure equalization chamber 130 can pass through this opening 134 into the clutch space to cool the disks 86, 88.

A plain bearing 136 is provided between the clutch cover 36 and the internal disk carrier 96 to axially support the two components. Analogously, a needle bearing 138 is provided between the internal disk carrier 96 of the clutch unit 2 and the inner disk carrier 98 of the clutch unit 4 and a plain bearing 140 between the inner disk carrier 98 and the wall portion 132.

What is claimed is:

1. Gearshift mechanism for a motor vehicle with hydraulically-actuated multiple clutch, comprising a first gear input shaft for driving a first group of gears, a second gear input shaft for driving a second group of gears, respective clutch units operatively associated with the gear input shafts which are arranged coaxially with the clutch units and one another, and a stationary housing configured to accommodate the clutch units and to be closed off on an end face thereof by a housing cover with a central opening through which a drive hub of a clutch cage is guided, wherein the housing cover has a bearing flange around the central opening, and the clutch cage is operatively arranged on a radially outer portion of the bearing flange via a radial bearing.

2. Gearshift mechanism as claimed in claim 1, wherein a clutch cover is screwed to and closes off the clutch cage and accommodates said drive hub.

3. Gearshift mechanism as claimed in claim 2, wherein the clutch cover includes a bearing collar supported on the bearing flange of the housing cover via the radial bearing.

4. Gearshift mechanism as claimed in claim 1, wherein an axial extension of the clutch cage has a rotating component for oil supply, which rotating component is coaxial to an outer of the gear input shafts and is radially supported and axially secured in the stationary housing via a fixed bearing.

5. Gearshift mechanism as claimed in claim 4, wherein the fixed bearing has a ball bearing axially clamped inside the stationary housing.

6. Gearshift mechanism as claimed in claim 4, wherein, on the outer circumference of the rotating component, circumferential annular grooves are provided, for the oil supply to actuate the clutch units and for a coolant supply of the clutch units which are provided with disks.

7. Gearshift mechanism as claimed in claim 6, wherein the fixed bearing has a ball bearing axially clamped inside the stationary housing.

8. Gearshift mechanism as claimed in claim 4, wherein the outer of the gear input shafts is supported in the rotating component via a third radial bearing.

9. Gearshift mechanism as claimed in claim 8, wherein the fixed bearing has a ball bearing axially clamped inside the stationary housing.

10. Gearshift mechanism as claimed in claim 9, wherein, on the outer circumference of the rotating component, circumferential annular grooves are provided, for the oil supply to actuate the clutch units and for a coolant supply of the clutch units which are provided with disks.

11. Gearshift mechanism as claimed in claim 1, wherein an inner of the gear input shafts includes an annular groove to receive a second radial bearing for providing support relative to the outer of the gear input shafts.

12. Gearshift mechanism as claimed in claim 1, wherein a shaft seal ring is provided inside the bearing flange and outside the drive hub of the clutch cage.

13. Gearshift mechanism as claimed in claim 1, wherein the housing cover is screwed to the housing and outwardly sealed via an O-ring seal.

* * * * *